3,093,660
POLYMERIC PRODUCTS OF DECABORANE AND CYCLIC ETHERS AND THEIR PREPARATION
Victor D. Aftandilian, Wilmington, Del., and Walter H. Knoth, Jr., Mendenhall, Pa., assignors to E. I. du Pont de Nemours and Company, Wilmington, Del., a corporation of Delaware
No Drawing. Filed Jan. 15, 1959, Ser. No. 786,917
4 Claims. (Cl. 260—346.1)

This invention relates to polymeric materials. More particularly, it relates to polymeric materials containing boron and to their preparation.

Boron hydrides have received considerable study during the past few years, and certain boron hydrides and their derivatives have been found of interest in various applications. One such application which has recently been developed is the use of these boron hydride derivatives as reducing agents for specific purposes. Since the value of a particular reducing agent in any specific application depends on other properties in addition to its reducing action, the development of new reducing agents of this type having an improved combination of properties is indeed a desideratum.

We have recently found a group of new boron hydride derivatives having an improved combination of properties. Our novel products comprise the polymeric reaction products of decaborane and a monooxacyloalkane having in the ring from two to four carbon atoms which may have hydrocarbon substituents, such polymers containing 0.1–10.0% boron and being capable of reducing silver ion to silver. The hydrocarbon substituents in products of our invention can be alkyl, alkenyl, cycloalkyl, or aryl radicals. A preferred group of the polymeric reaction products are those prepared from monooxacyloalkanes in which any hydrocarbon substituents have at the most six carbon atoms.

The polymeric reaction products of decaborane and a monooxacyloalkane are prepared by contacting a monooxacyloalkane having in the ring from two to four carbon atoms which may have hydrocarbon substituents, with decaborane at a temperature between −50° and 50° C.

The relative proportions of decaborane and the monooxacyloalkane used in the process of this invention are not critical. Usually at least one mole of the cyclic ether is used for each mole of decaborane. When a high molecular weight product is desired, it is preferred to use a large excess of the monooxacycloalkane reactant since the larger the proportion of the monooxacyloalkane used the greater is the number of recurring cyclic ether groups formed in the polymeric product. Excess monooxacyloalkane also serves as a solvent for the polymeric reaction product.

Reaction of the decaborane with the monooxacyloalkane takes place at ordinary temperatures. However, moderately elevated or moderately reduced temperatures, e.g., temperatures from about −50° to about 50° C. can be used if desired.

The reaction pressure employed is likewise not critical. Atmospheric pressure is very convenient. However, superatmospheric or subatmospheric pressures are also operable. For example, pressures of 0.2 atmosphere or lower or up to 10 atmospheres or more can be used.

The reaction between the decaborane and the cyclic ether takes place simply on mixing the two reactants together. Reaction times ranging from one minute to several weeks, e.g., 3–4 weeks can be employed. The particular reaction time depends on several factors such as the particular monooxacyloalkane, the reaction temperature, and the particular molecular weight or degree of polymerization desired in the final product. As for the particular monooxacyloalkanes, those having two annular carbons are the most reactive and require the shortest reaction times while those having four annular carbons require the longest reaction times. As for the particular reaction temperatures, the lower temperatures employed require the longer reaction times and, conversely, the higher reaction temperatures require the shorter reaction times.

In some cases it is advantageous to carry out the reaction in the presence of an inert solvent, for example, an ether such as diethyl ether or dimethoxyethane. The use of an inert reaction medium is particularly useful when it is desired to moderate the reaction between decaborane and the monooxacyloalkane.

The exact structure of the decaborane/monooxacyloalkane polymeric reaction products is not known, but they contain from 0.1–10% of boron on analysis. They vary from viscous liquids to solids. They are stable in air at room temperature and are soluble in ethers. The ethereal solutions are strong reducing agents.

The invention is illustrated in further detail by the following examples.

*Example I*

A 0.335 molar solution of decaborane in tetrahydrofuran is prepared by dissolving 2.05 g. of decaborane in 50 ml. of tetrahydrofuran. This solution is left standing at room temperature for a period of four weeks. In this period the color of the originally colorless solution gradually changes to dark yellow and a thick yellow syrup is formed. The material is transferred into a high speed mixer and treated with ice water. The aqueous layer is decanted and the process is repeated six times. A white fibrous polymer is obtained. This product is dried in a vacuum desiccator at 25° C. and 0.01 mm. mercury pressure. Analysis: The polymer is found to contain 3.00% boron, 56.63% carbon and 10.16% hydrogen.

This tetrahydrofuran/decaborane polymer is quite stable in air at room temperature. It is soluble in ethers, e.g., tetrahydrofuran, diethyl ether and 1,2-dimethoxyethane, and in benzene but is insoluble in water, pentane and heptane. It has a softening point of about 45–50° C. The viscosity of the polymer measured in 0.1% benzene solution at room temperature is as follows:

$$n_{rel} = 1.027; \ n_{inh} = 0.27$$

The ethereal solutions of the polymer exhibit very strong reducing properties. For example, when silver nitrate is added to a diethyl ether solution of decaborane/tetrahydrofuran polymer, the silver ion is immediately reduced to metallic silver. When the polymer is suspended in aqueous silver nitrate solution, black metallic silver is deposited on the surface of the polymer.

*Example II*

Decaborane (1.0 g., 8.2 millimole) is dissolved in 15 ml. of propylene oxide and the reaction mixture is stirred in an ice bath for one hour and at room temperature (approximately 20–25° C.) for 20 hours. Unreacted propylene oxide is removed by subjecting the reaction mixture to a vacuum at 25° C. The resulting light yellow viscous liquid obtained as a residue is subjected to a vacuum of 5 microns mercury at 50° C. for several hours. On analysis, this polymer is found to contain 55.36% carbon, 10.74% hydrogen, 7.55% boron, and to have molecular weight of 575. The infrared absorption spectra obtained on this polymer indicate that it contains B—H bonds.

This liquid decaborane/propylene oxide polymer rapidly reduces aqueous silver nitrate to metallic silver.

The examples have illustrated the process of this invention by reference to the reaction of certain monooxacycloalkanes with decaborane. However, the products of this invention include the polymers obtained from decaborane and other monooxacycloalkanes of the type defined hereinbefore. Any monooxacycloalkane having the formula $(CR_2)_nO$, wherein R is hydrogen or an alkyl, alkenyl, aryl or cycloalkyl radical, especially such radicals having 1–6 carbon atoms, and n is 2, 3 or 4, can be used in this reaction with decaborane. More specifically, examples of other monooxacycloalkanes that can be reacted with decaborane in the process of this invention include: ethylene oxide, (1,2-epoxyethyl)benzene, 1,2-epoxypropane, 1,2-epoxy-2-methylpropane, 2,3-epoxybutane, 2,3-epoxypentane, 1,2-epoxy-3-butene, 1,2-epoxy-3-methylbutane, 1,2-epoxy-1,2-dimethylpropane, 2,3-epoxy-1,2-dimethylbutane, 1,3-epoxypentane, 1,3-epoxyhexane, 2-methyltetrahydrofuran, 2,5-dimethyltetrahydrofuran, 2,2-dimethyltetrahydrofuran, and 2,2,5,5-tetramethyltetrahydrofuran.

As indicated above, the ethereal solutions of the decaborane/monooxacycloalkane polymers exhibit very strong reducing properties. A particular application of this property is the use of the polymer having a silver surface, obtained by the treatment of the polymer with aqueous silver nitrate solution, in the preparation of electrical conducting circuits.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Polymeric products obtained by reacting at a temperature of from —50° C. to 50° C. decaborane with a monooxacycloalkane of the formula $$(CR_2)_nO$$

wherein R is a member selected from the class consisting of hydrogen, alkyl radicals of 1 to 6 carbon atoms, alkenyl radicals of up to and including 6 carbon atoms, phenyl, and cycloalkyl radicals of 3 to 6 carbon atoms, and n is a cardinal number of from 2 to 4, said polymeric products containing 0.1–10.0% boron.

2. Process for preparing polymeric reaction products of decaborane and a monooxacycloalkane which comprises reacting a monooxacycloalkane having in the ring from two to four carbon atoms, any substituents on the ring carbons being hydrocarbon substituents of up to and including 6 carbon atoms and selected from the class consisting of alkyl, alkenyl, cycloalkyl, and aryl groups, with decaborane at a temperature of between —50° and 50° C.

3. Polymeric product obtained by reacting decaborane and tetrahydrofuran at a temperature of from —50° C. to 50° C., said product being characterized by being a solid at room temperature, stable in air at room temperature, soluble in ethers, and by being capable of reducing silver ion to silver.

4. Polymeric product obtained by reacting decaborane and propylene oxide at a temperature of from —50° C. to 50° C., said product being characterized by being liquid at room temperature and by being capable of reducing silver nitrate in aqueous solution to metallic silver.

References Cited in the file of this patent

Stock: Hydrides of Boron and Silicon (1937) page 17.
Bergman: Chemistry of Acetylene and Related Compounds, Interscience Pub. Inc., (1948), page 80.
Stone et al.: J. Chem. Soc., London, (1950), pages 2755–9.
Schechter et al.: Boron Hydrides and Related Compounds, (declassified—1953), page 37.
Uhler et al.: Nuclear Science Abstracts, volume 12, No. 4, page 311, (February 28, 1958).